United States Patent [19]

Blanchard

[11] 3,763,394

[45] Oct. 2, 1973

[54] STAGE LIGHTING SYSTEMS

[76] Inventor: Stanley Blanchard, 4 Washington Square, New York, N.Y. 10012

[22] Filed: Sept. 3, 1971

[21] Appl. No.: 177,701

[52] U.S. Cl. .................. 315/294, 315/295, 315/297, 315/315, 315/316

[51] Int. Cl. .................. H05b 39/06

[58] Field of Search ............ 315/291–298, 314–316, 312, 313

[56] References Cited

UNITED STATES PATENTS

| | | | |
|---|---|---|---|
| 3,579,030 | 5/1971 | Bentham et al. | 315/312 |
| 3,491,263 | 1/1970 | Isaacs | 315/294 X |
| 3,448,338 | 6/1969 | Bentham et al. | 315/295 |

*Primary Examiner*—Alfred L. Brody
*Attorney*—Paul S. Martin

[57] ABSTRACT

A stage lighting system here utilizes circulating shift registers for containing many groups of bits for concurrent control of correspondingly many light-intensity control circuits. Control information can be entered into each circulating shift register in various ways, as by entering a group of bits at a time under manual control for establishing a desired level of control of a given light-intensity control unit, or as by entering sequences of groups of bits from a memory unit or from another circulating shift register, or in other ways; and the contents of each circulating shift register can be recorded in the memory unit.

Each supplied light-intensity control signal is subject to fading under control of a timed sampling circuit. A supplied light-intensity control signal is sampled for a part of each of a succession of sampling periods. The sampling part can be varied from zero to the entire sampling period, for reducing the supplied light-intensity control signal in accordance with the ratio of the sampling part of the fade-control period to the whole sampling period. The same fading control system is extended to cross-fading by utilizing the remainder of each fade-control period as the sampling period for another supplied light-intensity control signal.

23 Claims, 10 Drawing Figures

STAGE LIGHTING SYSTEMS

This invention relates to stage lighting control systems such as are used in theaters, television studies, and the like.

A number of lighting units each with its own intensity control unit, or groups of lighting units controlled by respective intensity control units, form a basic part of modern stage lighting equipment. During rehearsal, manual controls are used for establishing a pattern of intensities of individual lighting units or groups of lighting units. The lighting pattern in effect at any one time may be called a lighting cue. Successive lighting cues are needed for successive times in a performance. Efforts have been made to devise practical systems for storing lighting cues in a memory storage. However, known systems of this kind have been prohibitively expensive or inflexible in use, or both. Accordingly, an object of the present invention resides in the provision of a novel, economical and flexible system for separately controlling the intensities of plural lighting units and for storing and playing back successive lighting cues.

Stage lighting commonly includes a means for upfading a lighting unit or plural lighting units or for down-fading such unit or units. In addition, a means is often needed for cross-fading from one lighting cue to another. Up-fading, down-fading, and cross-fading of an individual lighting unit, and changing to or from a pattern of light intensities of a cue, as well as going from one pattern of light intensities of one cue to another pattern of light intensities of another cue is also needed in modern stage lighting systems. Accordingly, a further object of the present invention resides in providing novel, economical and flexible fader controls for light-intensity control means of stage lighting equipment.

In achieving the objects of the present invention, a novel system of control for multiple stage lighting units or groups of units is shown in the accompanying drawings and described in detail below, including a preferred embodiment of a lighting control system and modifications of portions of the preferred system. Briefly, the illustrative embodiment involves plural circulating shift registers or recirculating registers for containing control information in the form of binary bits (0 and 1). The content of the recirculating register is divided into groups of bits, and each group is identified with a respective lighting control channel. In the embodiment described, there are eight control bits per channel and 64 channels for a total of 512 bits in the circulating shift register. The system includes a random access memory unit such as a plated-wire memory unit, having what may be called a "memory" corresponding to each cue in a succession of many lighting cues. Each memory contains enough bits to fill the shift register, divided into the same groups as the recirculating register. A channel sequencer acts to transfer the contents of a selected memory to a serial-to-parallel converter, group by group, until the entire memory has been transferred to the recirculating register. The bits of each group are simultaneously transferred from the memory to the parallel-to-serial converter.

The content of a recirculating register can be transferred from a memory as described, or it can be built up or modified channel by channel in a variety of ways, as by transfer from a one-channel manual amplitude control, and in other ways. Any given group of bits in the recirculating register can be removed and replaced, as may be desired.

The output of a circulating shift register in the described illustrative system is transferred one group of bits at a time, into a serial-to-parallel converter and then to a buffer storage and finally to a digital-to-analog converter. A number of store-and-hold circuits are provided, one for each channel of the recirculating register. The output of the digital-to-analog converter represents the successive groups of bits in the recirculating register and is transferred successively to corresponding store-and-hold circuits. Each such store-and-hold circuit controls a respective light-intensity control circuit for a lighting unit or a group of units.

When any given recirculating register contains groups of bits that represent a desired lighting cue, it can be transferred into the memory unit, as a "memory." The data is taken as successive groups of bits from the buffer storage.

The operation of the foregoing lighting control system is synchronized by clock pulses and group transfer pulses. The content of the recirculating register advances one clock-pulse at a time. Groups of bits for each control channel are transferred concurrently into the parallel-to-serial converter and out of the serial-to-parallel converter and out of the buffer register to the memory unit and to the digital-to-analog converter, group after group. The entire system is characterized by the coordinated transfer of groups of bits in synchronized relation to the circulation of bits in the recirculating register.

The illustrative system includes multiple circulating shift registers. Each recirculating register is available for entry of control information from a memory or from individual channel input controls or from another recirculating register. The contents of each of these recirculating registers are transferred, a group of bits at a time, to a related serial-to-parallel converter, to a related buffer storage register and then to a related digital-to-analog converter. In the preferred embodiment, the output of the digital-to-analog converter is switched to successive store-and-hold circuits for controlling the respective intensity control circuits of various lighting units in the system.

When a desired level of light-intensity control signal is in effect in a store-and-hold circuit, whether derived under manual control or from a memory, a fader is used for up-fading or down-fading to or from that level. The various light-intensity control signals of a lighting cue can be used concurrently in an up-fade mode or in a down-fade mode. A cross-fader for shifting from the light intensities of one lighting cue to the light intensities of another lighting cue is also provided. Up-fading, down-fading and cross-fading are all achieved either manually or timed automatically, as may be desired.

Fading is accomplished by a distinctive form of control. A series of fade-control periods is established. Each fade-control period is divided into a first part and a second part. The duration of the first part of each fade-control period can be varied from zero to the entire period, and the duration of the second or remaining part of each fade-control period is correspondingly varied from the entire period to zero. The first parts of the successive fade-control periods can be utilized in one fader. The second parts of the successive fade-control periods can be utilized in another independent fader. Both faders control the same lighting units, to go from one lighting cue to another. Still further, the first and second parts of successive fade-control periods can be used for cross-fading. Each fader can be manually adjusted. Controls for automatically timing a fading operation are also provided. Whether the first parts or the last parts of successive fade-control periods are utilized in a given fader, a series of available light-intensity control signals are sampled for the duration of one part of each fade-control period and the output is averaged over the whole fade-control period, for providing a fader-controlled light-intensity control signal. This may be varied from zero to the full value of the supplied light-intensity control signal, by varying the fraction of the fade-control period that is occupied by the sampling part of the fade-control period. This applies whether the first part or the second part of the fade-control period is used for sampling the supplied light-intensity control signals of a lighting cue.

In the case of cross-fading, the first part of a fade-control period is used for sampling one supplied light-intensity control signal and the remaining part of a fade-control period is used for sampling another supplied light-intensity control signal. Cross-fading occurs as the sampling is changed progressively from a first part of zero duration and a full-period-length second part of each fade-control period, to a full-period-length first part and a zero-length second part of each fade-control period. With this change, a series of lighting control units can be shifted progressively from control by one series of supplied intensity-control signals to control by another series of supplied intensity-control signals. Apart from manual controls, the entire fading apparatus can be made of wholly electronic means, without resort to mechanical servos or the like.

The entire system is susceptible of low-cost construction that is economical, compact and highly dependable. It is also extremely flexible in use and has other advantages and attributes that will become clear from the following detailed description of the whole presently preferred system and its modifications which are shown in the accompanying drawings and described in detail below, as illustrative embodiments of the invention in its various aspects.

DESCRIPTION OF FIG. 1

Figure 1:
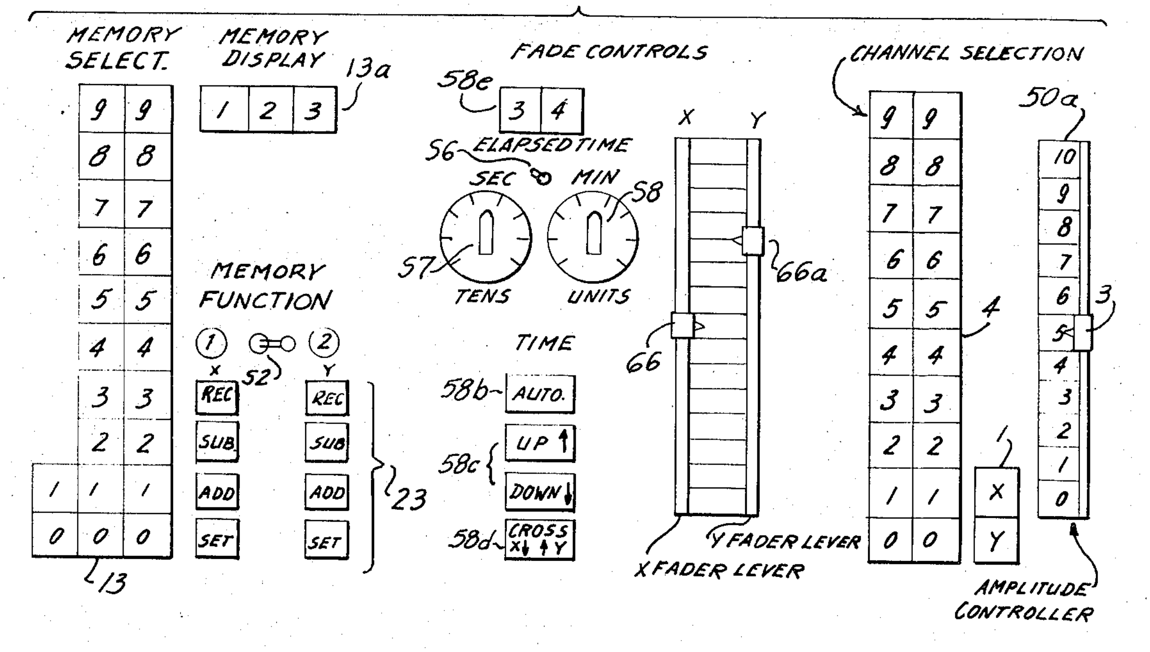
FIG. 1 is a diagram of the manual control panel of the illustrative stage lighting system.
Figure 2:
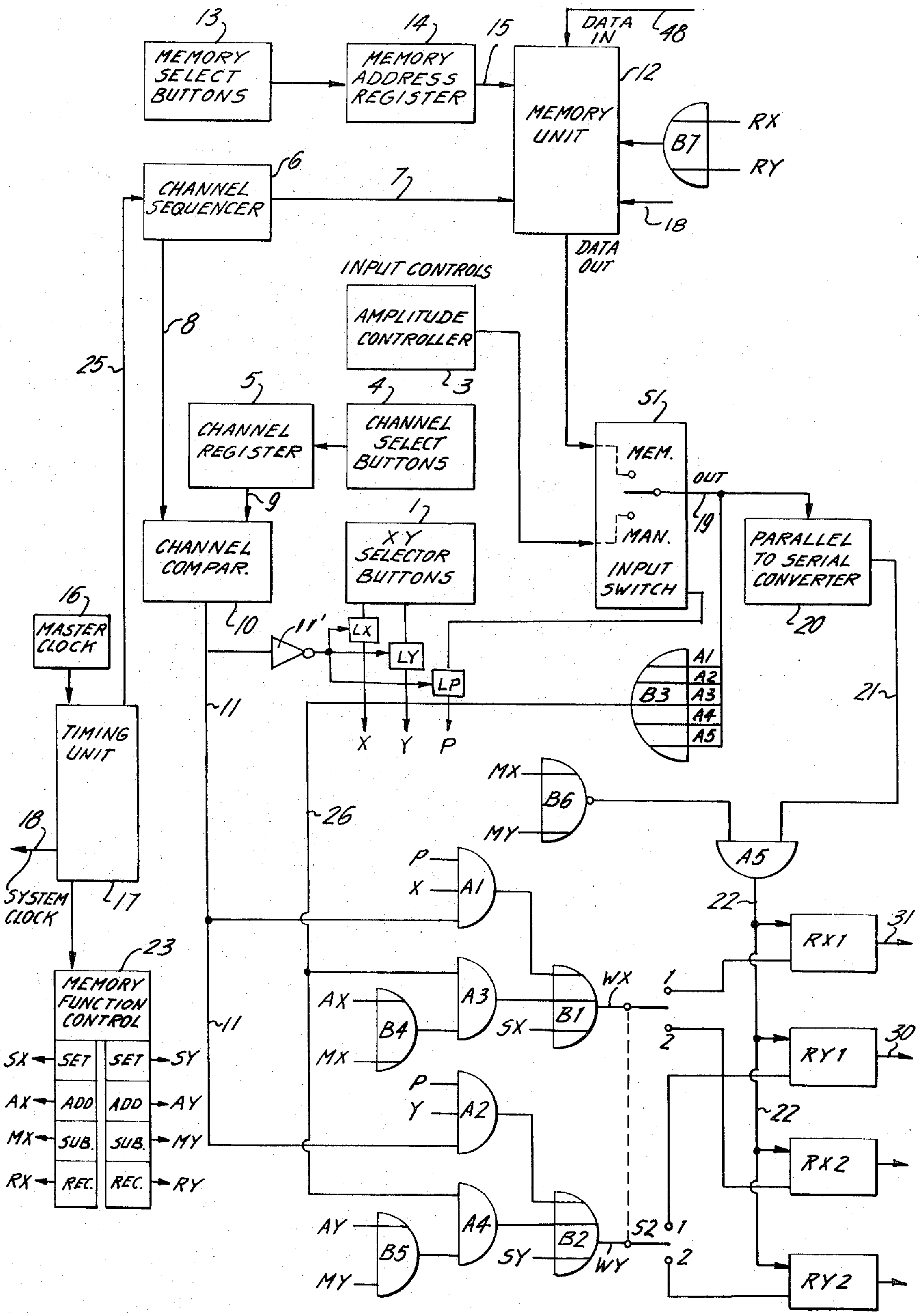
FIGS. 2 and 3 are block diagrams of portions of the illustrative stage lighting system, certain portions of the system appearing in both FIG. 2 and FIG. 3 to facilitate reading of each diagram separately.
Figure 3:
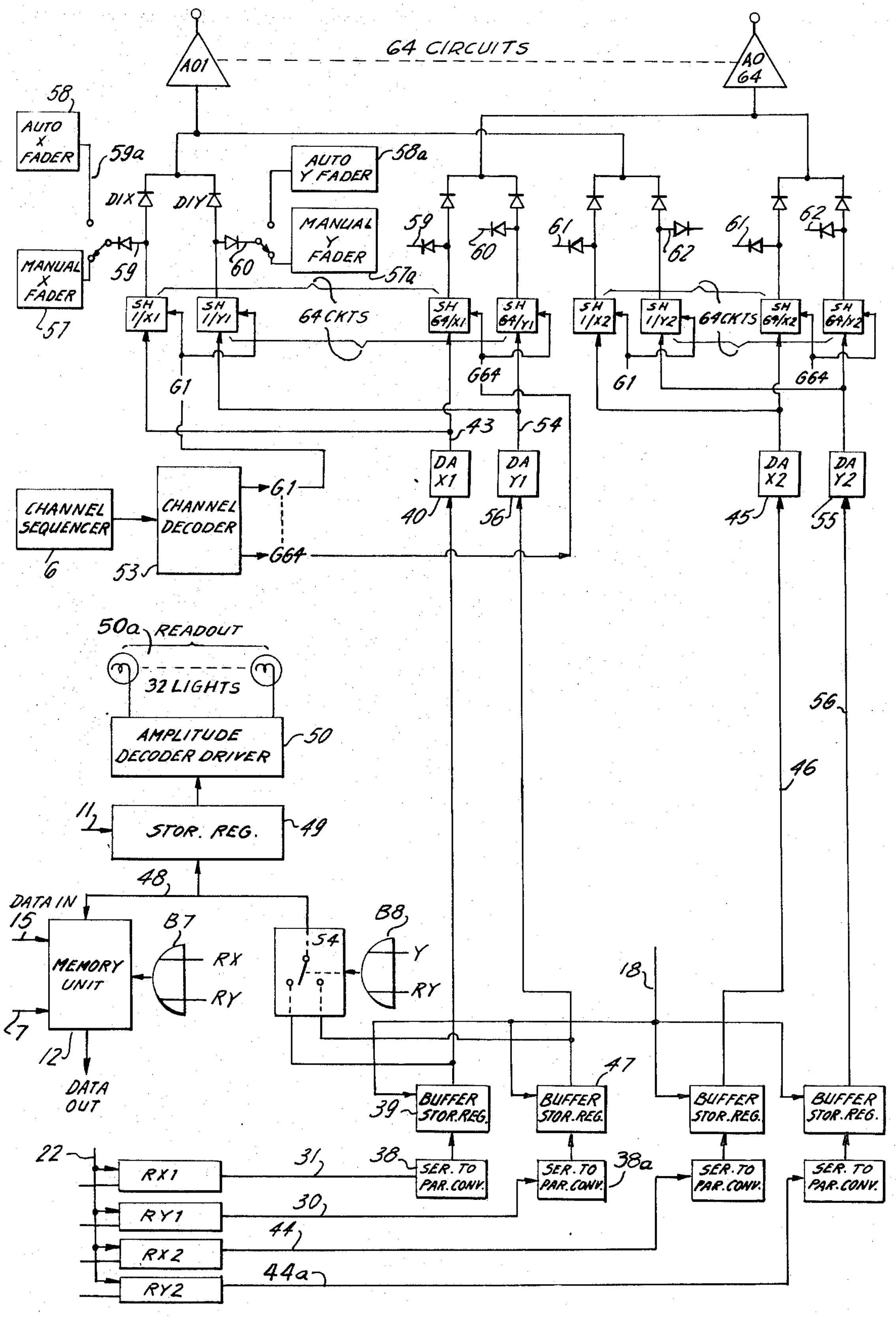

Referring now to the drawings, FIG. 1 illustrates a manual control panel for the stage lighting system of FIGS. 2 and 3. The lighting control system includes symmetrical pairs of recirculating registers and output channels extending from those registers. One register of each pair is designated "X" and the other recirculating recirculating register of each pair is designated "Y". Push buttons 1 are provided for controlling entry of information into the X and Y recirculating registers, respectively. Amplitude read-out display **50*a* (see also FIG. 3) represents the light intensity of a selected control channel. A manual light intensity controller 3 is ordinarily a lever that controls a binary encoder, of five bits in an example. Push buttons 4 are provided for selecting any desired lighting-control channel from channel 1 through channel 99 although, as will be seen, there are only 64 channels in the system of FIGS. 2 and 3. Manual X and Y fader levers 66 and 66*a* form part of a fader (see also FIGS. 4 and 5) that may be used as the manual faders in FIG. 3. Push button switches 58*b*, 58*c* and 58*d* are for controlling the automatic fader 58 in FIGS. 3 and 6. Selector switch S6 controls the variable divider 81 (see also FIGS. 6 and 7) to establish timing in minutes or seconds of the automatic fader, and switches S7 and S8 determine the units and tens, respectively, of minutes or seconds of the fade-timing interval. Display 58*e* shows the elapsed time in the operation of the automatic fader of FIGS. 6 and 7. The lighting control system of FIGS. 2 and 3 includes a memory unit 12 having a capacity of 199 "memories," and push buttons 13 of FIG. 1 control the selection of any desired one of those memories for setting up a corresponding memory address. Display 13*a*** shows the push button selection.

Switch S2 and memory function control push buttons 23 are manual controls forming part of the lighting control system, as will be clear from the discussion of FIG. 2.

DESCRIPTION OF FIG. 2

Referring now to FIGS. 2 and 3, the lighting control system shown provides channels for control of 64 different output circuits. The output of each such circuit controls a conventional light-intensity control circuit or group of circuits (not shown) which, in turn, provide control(s) for an individual lamp or a group of lamps which are to have common lighting intensity.

The control information of all of the 64 channels is stored in binary forms in memory unit 12. This is a random-access memory and may be a ring-core type or any other suitable form. However, a plated-wire memory is preferred since the stored information is not erased as an incident of a read-out operation. Each part of memory unit 12 which controls the 64 lighting channels at any one time, representing a "lighting cue," is called a "memory." In an example each memory contains 64 groups of eight bits of control information, giving a total of 512 bits in each memory.

Five of the eight bits of each group in a memory are amplitude control bits, recorded as a five-bit binary code. The other three bits are available for various auxiliary control functions, as for example to control the positive of a color-wheel forming part of a lighting unit whose intensity is controlled by the other five bits of that channel. The auxiliary control functions are not the subject of the present invention and will not be discussed further.

Memory unit 12 has a capacity of 199 memories, each having 512 bits. Any given memory is selected by memory-select push buttons 13 that establish a memory address code in register 14 for application via line 15 to memory unit 12.

When a memory of memory unit 12 has been selected by means of appropriate push buttons 13, that memory appears at the "data out" line of memory unit 12. Channel sequencer 6 provides successive counts on line 7 in binary codes, which causes 64 successive groups of eight bits to appear as parallel output on the "data out" line of memory unit 12, recycling continuously. The five amplitude-control bits forming a binary code for each channel in the output of memory unit 12 are applied in parallel to the "memory" input of switch S1.

Switch S1 also has a "manual" input. Amplitude controller 3 comprises a manual lever that operates a binary encoder of five bits, capable of providing 32 different binary-code combinations. This encoder provides the manual input to switch S1.

Channel select buttons 4 are depressed for determining the channel in which amplitude controller 3 is to be effective. Channel register 5 stores the identification of the channel select buttons last operated.

Switch S1 is an electronic two-position switch that provides eight concurrent data connections via channel 19 to parallel-to-serial converter 20 from either manual data input means or memory unit 12. Switch S1 normally connects the memory unit 12 to parallel-to-serial converter 20. Switch S1 automatically goes to the "manual" position when the attendant (1) touches amplitude controller 3 and (2) adjusts the amplitude controller to a position such that its digital code matches the code then in effect for controlling the light intensity of the channel selected by the push buttons 4. The details of the control apparatus causing switch S1 to go to its "manual" position are unnecessary to the understanding of the present invention, and are omitted.

Master clock unit 16 provides clock pulses continuously at a rate of somewhat greater than 65,000 Hz, in this example. Timing unit 17 emits a control pulse every eighth clock pulses on line 25 as input to channel sequencer 6. This channel sequencer may be a binary counter having a count capacity of 64.

When the count in channel sequencer 6 as evidenced on output line 8 matches the digital value in channel register 5 as evidenced on line 9, channel comparator 10 produces an output on line 11. This output has a duration of eight clock pulses. As will be seen, this output enables gates A1 and A2 for causing entry of the manually set code of amplitude controller 3 into a recirculating register at a time slot representing the channel selected by push buttons 4.

Correspondingly, channel sequencer 6 produces successive channel-address codes on line 7 at clock-pulse intervals. This causes memory unit 12 to provide parallel read-out of successive groups of eight bits, each group remaining available for an eight-bit interval. Successive groups represent the successive control channels No. 1 through No. 64 in a selected memory.

The output of switch S1 to the input of parallel-to-serial converter 20 provides a series of eight bits on line 21 at clock-pulse intervals. The bits on line 21 will be a cyclic repetition of eight bits with switch S1 in its "manual" position, the eight bits including five binary-code bits representing the manually set light-intensity code of controller 3. The bits on line 21 will be the whole continuous sequence of the 512 bits of a selected memory that repeats cyclically, when switch S1 is set in its "memory" position. AND gate A5 has an enabling bias on the input from OR gate B6 at all times except when there is input to this OR gate. Accordingly, with switch S1 in either the "manual" or the "memory" position, data on line 21 ordinarily reaches bus 22.

Four circulating shift registers RX1, RY1, RX2 and RY2 are part of the system of FIG. 2. It will be appreciated that additional recirculating registers can be included. Moreover, the additional recirculating registers may be selected for use by special controls other than X and Y selector buttons 1. The four recirculating registers shown in FIG. 2 provide a substantial range of system flexibility. Each recirculating register shown has a capacity of 512 bits, to contain a full memory from memory unit 12. The content of each recirculating register circulates continuously, advancing in one-bit steps at the rate of the clock pulses from master clock 16, due to connections not shown. However, so long as there is a bias on a "write" line of any given recirculating register, the data on bus 22 will replace that being circulated, bit by bit.

Manual entry of an intensity code from amplitude controller 3 into a recirculating register may now be described. Depression of an X button 1 (for example) produces an enabling signal X at gate A1 via synchronizing latch LX. Latches LX, LY and LP are set or reset by inverter 11' only while no channel signal is present. With switch S1 in its "manual" position, that switch produces a "P" signal, providing one enabling input to each AND gate A1 and A2. The Y selector button was not pressed, so there is no Y input to gate A2. Enabling input now appears at the P and X inputs of AND gate A1. When a signal (eight clock-pulses long) appears on line 11 in the output of channel comparator 10, gate A1 applies a signal to OR gate B1, producing a "write" signal WX that reaches recirculating register RX1 with switch S2 set to its "1" position. Consequently, a group of eight bits on bus 22 will be entered in recirculating register RX1 at the proper part of its 512-bit content to represent the channel selected by channel select push buttons 4.

Entry of a 512-bit memory from memory unit 12 into a recirculating register can take place in various ways. Once again, recirculating register RX1 is considered. Switch S1 is set to its "memory" position. By pressing the X SET button of the memory function control buttons 23, an SX signal is provided to OR gate B1. With switch S2 in its 1 position, this causes the write line WX to interrupt the circulation of data in recirculating register RX1 and to substitute the data on bus 22. That data is the memory selected by memory select buttons 13. Timer 17 synchronizes memory function controls 23 to initiate signals SX, SY, AX etc. at the beginning of the first channel period and terminate at the end of the last channel period, so as to include one complete memory of 64 channels.

Data from a memory can also be entered in a recirculating register selectively in the following manner. It may be considered in this connection that the selected memory contains data that applies to one certain channels and is blank in others. The presence of light-intensity data requires at least one 1 bit among the five bits of the light-intensity code whereas five 0 bits would signify a blank. With switch S1 in the memory position "ADD X" button of memory function control 23 is depressed. On a channel-by-channel basis, each channel of an eight clock-pulse duration appears at parallel output 19 of switch S1. For each channel that is not blank, a bias will be applied to at least one of the five lines allocated to carry the light-intensity code to OR gate B3 for application to AND gates A3 and A4. Signal AX on OR gate B4 sends a bias signal to OR gate B1. On a channel-by-channel basis, write line WX is activated to transfer data from memory unit 12 into recirculating register RX1. However, when the ADD-X button is pressed, the data previously circulating in recirculating register RX1 continues to circulate, and therefore is not erased or replaced, for the channels that are blank in the data reaching inputs bus 22 of the recirculating register.

The data in a recirculating register can be modified in yet another way. Depressing SUB (subtract) button X of the memory function control 23 produces an MX (minus-X) signal, which is applied to OR gates B4 and B6. This has the effect of blocking all data on bus 22. The appearance of any data at output line 19 of switch S1 will result in a bias on one input of gate A3 while the other input is enabled by signal MX from OR gate B4, thus producing a WX signal. Consequently, for those channels of a selected memory which do contain light-intensity data, the circulation of data in recirculating register RX1 will be interrupted. Bus 22 having nothing on it, the corresponding channels in the recirculating register will be erased. However, all channels in the selected memory that are blank will result in an absence of a WX signal at the corresponding channels in the recirculating register RX1, so that the circulation of data previously in those channels of recirculating register RX1 will continue to circulate.

The description of the operation of recirculating register RX1 applies also to recirculating register RX2 when switch S2 is set to its 2 position. Correspondingly, the same description applies to recirculating register RY1 when switch S2 is set to 1 and Y controls are used; and it also applies to recirculating register RY2 when switch S2 is set to its 2 position.

Some of the procedures that may be followed in the practical use of the system thus far described may be of interest at this point. As will appear from the description of FIG. 3 that follows, some or all of the stage lights can be made to respond at one time to any one of the recirculating registers in accordance with the content of that register. Recirculating registers RX1 and RX2 may both be used in sequence for concurrently controlling all of the stage lights, or recirculating registers RX1 and RX2 may be used concurrently or in sequence for controlling respective parts of the total complement of stage lights by entering control bits for some light-controlling channels in recirculating register RX1 and control bits for other light-controlling channels in recirculating register RX2. What has been said for recirculating registers RX1 and RX2 applies also to recirculating registers RY1 and RY2, and it is also readily feasible to use all four recirculating registers at one time or in sequence to control respective parts of the total complement of stage lights.

to adjust any one stage light, the X button (for example) is depressed and the channel select push button 4 is pressed corresponding to the light channel whose intensity is to be adjusted. Amplitude controller 3 is manipulated and switch S1 automatically goes to its "manual" setting. The codes of amplitude controller 3 are entered into the selected channel of recirculating register RX1 (assuming switch S2 is set at 1) and the intensity of the related stage light varies accordingly. All of the channels may be altered in this manner, one at a time. In practice, the apparatus that controls switch S1 prevents abrupt changes of light intensity that would otherwise occur when changing from memory control of any given channel to manual control of that channel.

While channel No. 8 (for example) is being adjusted, the light controlled by channel No. 4 continues to operate at the level that may have been entered previously in channel No. 4 of recirculating register RX1; and when a third light is being adjusted, the lights of channels No. 4 and No. 8 continue to respond to the amplitude codes in their respective channels of recirculating register RX1. This process continues until a whole lighting cue is established in recirculating register RX1. The "record" button REC of Memory Function Controls 23 is then depressed, and the information in recirculating register RX1 is entered in a selected memory of unit 12 under control of push buttons 13. The content of recirculating register RX1 is not affected by the recording operation.

In rehearsal, lighting cue No. 1 may control lighting channels No. 1 and No. 2, and the established light intensities are entered in memory No. "0," using recirculated register RX1.

Lighting cue No. 2 may be developed in another recirculating register, and then entered into memory No. "1." Lighting cue 2 may involve only lighting control channels No. 3 and No. 4.

Lighting cue No. 3 may consist of the combined settings of channels Nos. 1–4 previously established, as described. In preparation for this operation, memory No. "0" is selected by push buttons 13. Momentarily depressing the "SET X" memory function control button 23 enters memory No. "0" in recirculating register RX1. Next, memory No. "1" is selected using push buttons 13, and the ADD X push button is momentarily depressed. By virtue of the described effects of OR gates B3 and B4, the entries of channels No. 1 and No. 2 in recirculating register RX1 are not disturbed, but the content of memory No. "1" for controlling channels No. 3 and No. 4 is added in recirculating register RX1. Lighting cue No. 3 is then recorded in memory No. 2, consisting of lighting intensity control codes in channels No. 1, No. 2, No. 3 and No. 4.

Lighting cue No. 4 may consist of the same settings of lighting channels No. 1, No. 3 and No. 4, but the light of channel No. 2 may be extinguished. To set this up, memory No. 2 is entered in a selected recirculating register by depressing the right memory select button 13 and by depressing an X or Y "SET" button 23. The proper channel select button 4 is depressed corresponding to channel No. 2. Amplitude controller No. 3 is adjusted, automatically setting switch S1 to "manual." The lights of channels No. 1, No. 3 and No. 4 retain the intensities called for by the entry into the selected recirculating register, but the light of channel No. 2 is varied according to the setting of amplitude controller 3. Lighting cue No. 4 is then entered as "memory No. 3" in memory unit 12 under control of select buttons 13 and the Record button 23 corresponding to the circulating shift register in use.

During a performance, ordinarily the desired lighting cues are used in the prescribed sequence. However, the system has still further flexibility. Lighting cue No. 5 may consist solely of lighting unit No. 1 at its previous adjustment. This can be brought into effect during a performance by operating the lights using recirculating register RX1 containing memory No. 3, and setting lighting cue No. 4 from memory No. 3 in recirculating register RY1, then selecting memory No. 1 consisting of light-intensity data for channels No. 3 and No. 4 by using channel select buttons 13 and depressing Subtract Y push button 23 so that recirculating register RY1 contains only the light-intensity code for lighting channel No. 1, then shifting (by fading) the lights from control by recirculating register RX1 to control by recirculating register RY1.

DESCRIPTION OF FIG. 3

Recording

Data entered into recirculating registers RX1 and RY1 may include intensity control codes entered under control of manual amplitude controller 3 for any channel or channels, it may be taken from one or more memories as to various channels, and it may have blanks as to certain channels, due to omission of a code for that channel or due to a "subtract" operation. The "subtract" operation may be carried out one channel at a time under manual control, or whole groups of channel codes may be erased in the "memory" position of switch S1. In any case, the content of each of recirculating registers RX1 and RY1 can be transferred to a memory under control of memory select buttons 13 and an X or Y "Record" push button 23.

As seen in FIG. 3, the output of recirculating registers RX1 and RY1 are connected by lines 30 and 31 to serial-to-parallel converters 38 and 38*a*. Here, these have a one-channel capacity of eight bits. At the end of each channel-width time period a pulse from line 18 causes transfer of the output from serial-to-parallel converters 38 and 38*a* to 8-bit buffer storage registers 39 and 47, respectively. Solid state switch S4 is normally in a condition to transmit the output data of X buffer storage register 39 to input data line 48 of the memory unit 12. Depressing the X Record button 23 applies a signal RX, to OR gate B6, thereby causing a whole cycle of data in recirculating register RX1 to be entered in the memory unit 12. Signal RX is timed by timing unit 17 to start with the beginning of channel No. 1 and to end with the end of channel No. 64 in the recirculating register.

Pressing the Y Record button 23 causes one complete recording cycle to be entered into a selected memory of memory unit 12 under control of a signal RY. This signal activates the record function and it also reverses switch S4 by providing input to OR gate B8.

Neither recirculating register $RX_2$ or $RY_2$ has coupling to memory unit 12 in the system shown but, is desired, selective controls for that purpose could be added.

Amplitude Readout

Depending upon which of the channel select buttons 4 has been operated, a signal of 8-bit duration on line 11 is applied recurrently to storage register 49 at a time during the circulating cycle of the recirculating registers that identifies the selected channel. Five of the eight bits are applied as parallel inputs to parallel amplitude decoder driver 50. This unit has five two-state stages, to selectively light one of the 32 lights 50*a* such as light-emitting diodes corresponding to the applied light-intensity code. Read-out lights 50*a* are arranged in a row along the path of manual amplitude-control lever 3 (FIG. 1). During manual adjustment of the light intensity of a given channel, the selected light will shift with the lever. However, the amplitude readout 50*a* will also provide a display at the control console of any channel in either recirculating register RX1 or RY1, as selected by push buttons 4 (FIGS. 1 and 2).

Lighting Intensity Control

The 5-bit intensity control output of buffer storage register 39 is applied, channel-by-channel in sequence, to digital-to-analog converter 40, to produce a direct-current signal on output line 43 that changes sixty-four times in the cycle of the recirculating registers. Channel sequencer 6 (see also FIG. 2) causes channel decoder 53 to provide control bias on each of the sixty-four lines G1 through G64 in sequence. Lines G1 to G64 control the sampling times of the sample-and-hold circuits SH-1/X1 through SH-64/X1 in synchronism with the successive channel signals in the output of D/A converter 40. The sample-and-hold circuits hold the previously sampled voltage level between successive gating signals. Subject to control by faders to be described, the output of these sample-and-hold circuits is applied through respective isolating diodes D-1-X to D-64-X to respective light-intensity control circuits AO-1 through AO-64. Each of these circuits comprises an input low-pass filter, a high input impedance amplifier and a dimmer. These circuits provide a light intensity of the controlled lamp or group of lamps (not shown) proportional to the d-c signal input.

Concurrent with the just described operation of the circuits between recirculating register RX1 and diodes D-1-X through D-64-X, the same operation takes place in the circuits from recirculating register RY1 to isolating diodes D-1-Y to D-64-Y. These circuits include serial-to-parallel converter 38a, buffer storage register 47 and digital-to-analog converter 56. As in the case of the circuits previously described, channel sequencer 6 switches channel decoder 53 for sequencing the output of digital-to-analog converter 56 on wire 54 to sample-and-hold circuits SH-1/Y1 to SH-64/Y1. The common output of diodes D-1-X and D-1-Y is applied to the related output amplifier A01, so that only the higher value of input takes effect.

What has been said about the circuits for achieving light-intensity control in accordance with the output of recirculating registers RX1 and RY1 applies also to the circuits that achieve light-intensity control in accordance with the output of recirculating registers RX1 and RY2, via lines 46 and 56, digital-to-analog converters 45 and 55, and two sets of sample-and-hold circuits as shown. Thus, four sources of light-intensity control are available to each light-intensity control unit AO-1 to AO-64, through isolating diodes that render the highest instantaneous d-c output effective to control the single series of sixty-four light intensity control circuits.

It is possible to transfer light-control signals from four different memories to the four recirculating registers and to utilize all four recirculating registers for concurrent light-intensity control in various ways. For example, certain channels, let us say channels No. 1–No. 32, may have intensity-control entries in recirculating registers RX1 and RY1 while channels No. 33–No. 64 of those registers may be blank, and channels No. 1–32 may be blank in recirculating registers RX2 and RY2 while intensity-control entries may be entered in channels No. 33–No. 64 of those recirculating registers. Various faders can be used to render channels No. 1–No. 32 as a sub-group variously effective under control of one or the other of recirculating registers RX1 or RY1, and to fade progressively from control by either one of these recirculating registers to control by the other. Correspondingly, faders can be used to determine and graduate the operation of the lights of channels No. 33–No. 64 as a sub-group under control of recirculating registers RX2 and RY2. Further, all four recirculating registers may have intensity-control signals for different groups of channels, e.g., register RX1: channels No. 1–No. 16; register RY1: channels No. 17–No. 32; register RX2: channels No. 33–No. 48; and register RY2: channels No. 49–No. 64. Those groups of channels can be down-faded to zero or up-faded to maximum, and they can be faded independently in groups.

One manual fader 57 is provided for the outputs of all sample-and-hold circuits SH-1/X1 through SH-64/X1. Another manual fader 57a is provided for all the outputs of sample-and-hold circuits SH-1/Y1 through SH-64/Y1. Automatic faders 58 and 58a are also provided, to produce either up-fading or down-fading, as described, according to a manually set rate. Suitable switches and isolating diodes are interposed in the respective fader-control lines 59 and 60. Correspondingly, fader control lines 61 and 62 are provided with faders. Optionally there are two more manual faders and two more automatic faders, switches to select between manual or automatic fading, and isolating diodes for enabling one fader to control sixty four separate sample-and-hold output circuits concurrently.

DESCRIPTION OF FIG. 4

Figure 4:
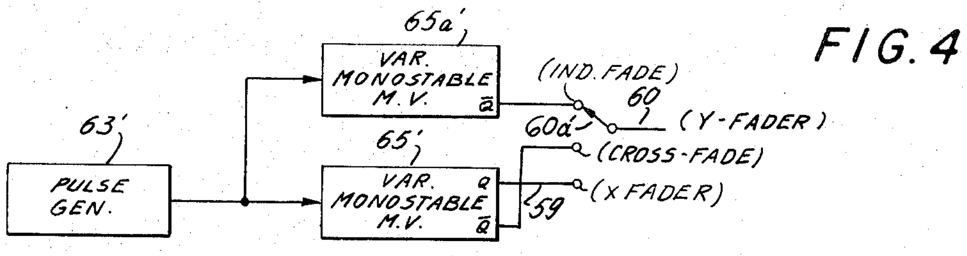
FIGS. 4 and 5 are block diagrams of two alternative circuits, each incorporating two separate faders and a cross-fader for the output channels of FIG. 3.

The diagram in FIG. 4 represents manual faders 57 and 57a of FIG. 3, and it includes a cross-fader as well.

Pulse generator 63′ may operate at a free-running frequency independent of the clock pulse generator 16 and the timing unit 17 of FIG. 1, or pulse generator 63′ may simply represent line 25 (FIG. 2) as a source of pulses. Variable monostable mulitvibrators (MV's) 65′ and 65a′ are triggered into their unstable stages by an incoming pulse and lapse into their stable states at a variable time following the triggering pulse. The variation is controlled manually as by a resistor operated by lever 66 or 66a or by an automatic timer (not shown).

MV 65′ has two outputs, a "Q" output and a "$\overline{Q}$" output. The Q output on line 59 turns "on" the output signal of the sample-and-hold circuits when the multivibrator is in its unstable state. (Suitable isolation, not shown, prevents discharge of the sample-and-hold circuits of FIG. 3.) The $\overline{Q}$ output switches "off" the signal at sample-and-hold outputs while the multivibrator is in its unstable state and switches "on" the sample-and-hold outputs with the multivibrator in its stable state. Thus the $\overline{Q}$ control output is the inverse of the Q control output. This is illustrated in FIG. 5A, where each triggering signal on source 63′ is immediately followed by a signal on output 65′Q whose duration is a variable part of the pulse period. At the end of each signal on output 65′Q and lasting until the next triggering pulse, there is another signal on line 65′$\overline{Q}$, the inverse of the signal at output 65′Q.

Like the signal on output 65′$\overline{Q}$, the signal at output 65a′$\overline{Q}$ starts when adjustable monostable multivibrator 65a′ lapses into its stable state and ends when the MV 65a′ is again triggered "on" by a pulse from source 63′.

It may be assumed that sample-and-hold circuit SH1/X1 has an output appropriate to cause full-brightness control and sample-and-hold circuit SH1/Y1 has an output appropriate to half-brightness control. It may also be assumed that multivibrator 65′ is adjusted to be "on" for 0 percent of the triggering pulse period and multivibrator 65a′ is adjusted to be "on" for 100 percent of its pulse period. Both outputs provide cut-off bias on lines 59 and 60 (see FIG. 3) under these conditions. Now it may be desirable to up-fade the lamp controlled by unit A01 under control of the output of sample-and-hold circuit SH1/X1. Gradually the manual control of MV 65′ is shifted from its 0 percent on-time position to its 100 percent on-time position. During this shift, an averaging or smoothing filter in the input portion of intensity-control unit AO-1 averages d-c output of sample-and-hold circuit SH1/X1 during the fraction of the "on" time over the full pulse period. The averaged d-c input to intensity-control unit A01 rises from zero to full brightness during operation of the manual control of MV 65′, for the assumed level of output of sample-and-hold circuit SH1/X1.

Correspondingly, if the manual control of MV 65′ is left at its 0 percent on-time adjustment and the manual control of MV 65a′ is moved from its 100 percent on-time position to 0 percent on-time position, the output of sample-and-hold circuit SH1/Y1 changes from 0 percent "on" time to 100 percent "on" time. This output is averaged over the pulse period in the light-intensity control unit AO-1 for any given adjustment of the manual control. As the control is operated for up-fading, the controlled light goes from dark to half-brightness with the assumed level of output signal of sample-and-hold circuit SH-1/Y1.

It may be desired to cross-fade, shifting from maximum-light intensity under control of one variable monostable multivibrator and the darkness adjustment of the other MV, to reverse the conditions of the multivibrators. As this is done, one signal 65′Q changes in length and the other signal 65a′$\overline{Q}$ changes in length oppositely. The end of pulses on output 65a′Q may occur before or after the start of pulses on output 65a′$\overline{Q}$, depending on the separate manual adjustments in MV's 65′ and 65a′. Thus there may be a gap or an overlap in the times when "on" bias is applied to outputs of the sample-and-hold circuits SH1/X1 through SH64/X1 and SH1/Y1 through SH64/Y1, respectively. In case of an overlap, the stronger signal would control at the input to each light-intensity control unit AO1, etc. In case of a small gap, there would be a slight departure from proportionality in cross-fading by simultaneous operation of the two manual controllers of MV's 65′ and 65a′. For ideal cross-fading, switch 60a′ is shifted from its independent position to its cross-fade position to output $\overline{Q}$ of MV 65′. Signals 65′Q and 65′$\overline{Q}$ vary inversely, with no gap or overlap in their timing. This condition provides ideal cross-fading input to intensity control units A01.

The same faders operate on all the intensity-control units A01 to A064, as described above, through suitable isolation means.

DESCRIPTION OF FIG. 5

Figure 5:
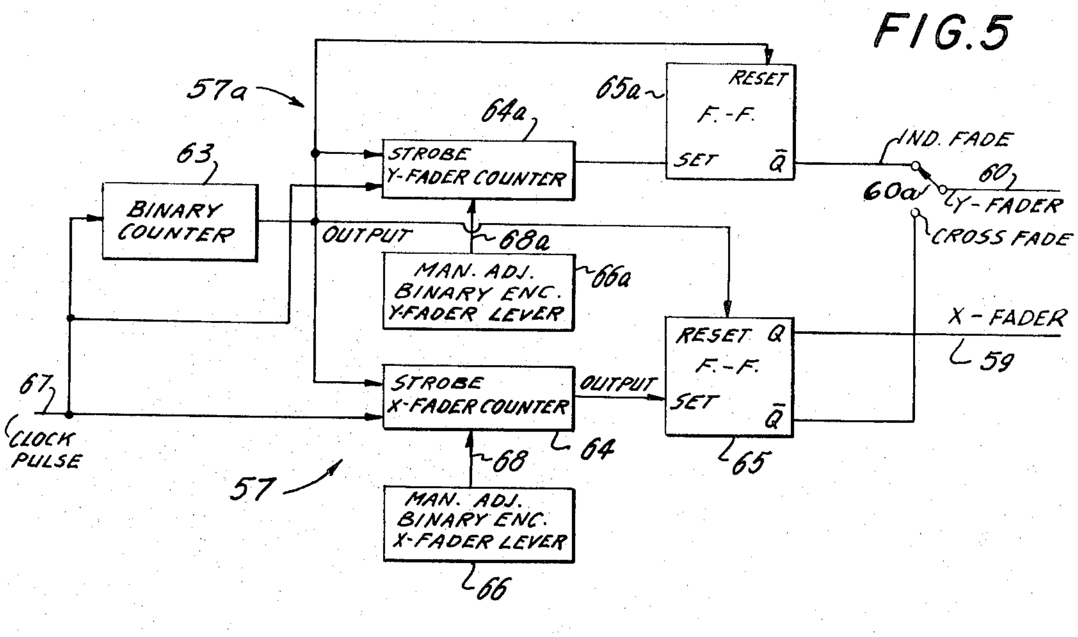
Figure 5A:
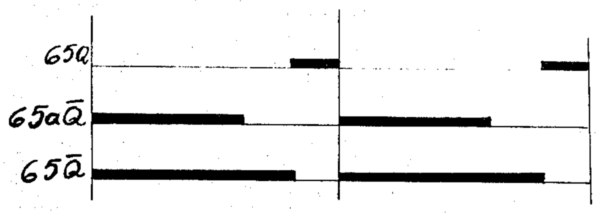
FIG. 5A is a timing chart illustrating the operation of FIG. 4.
Figure 6:
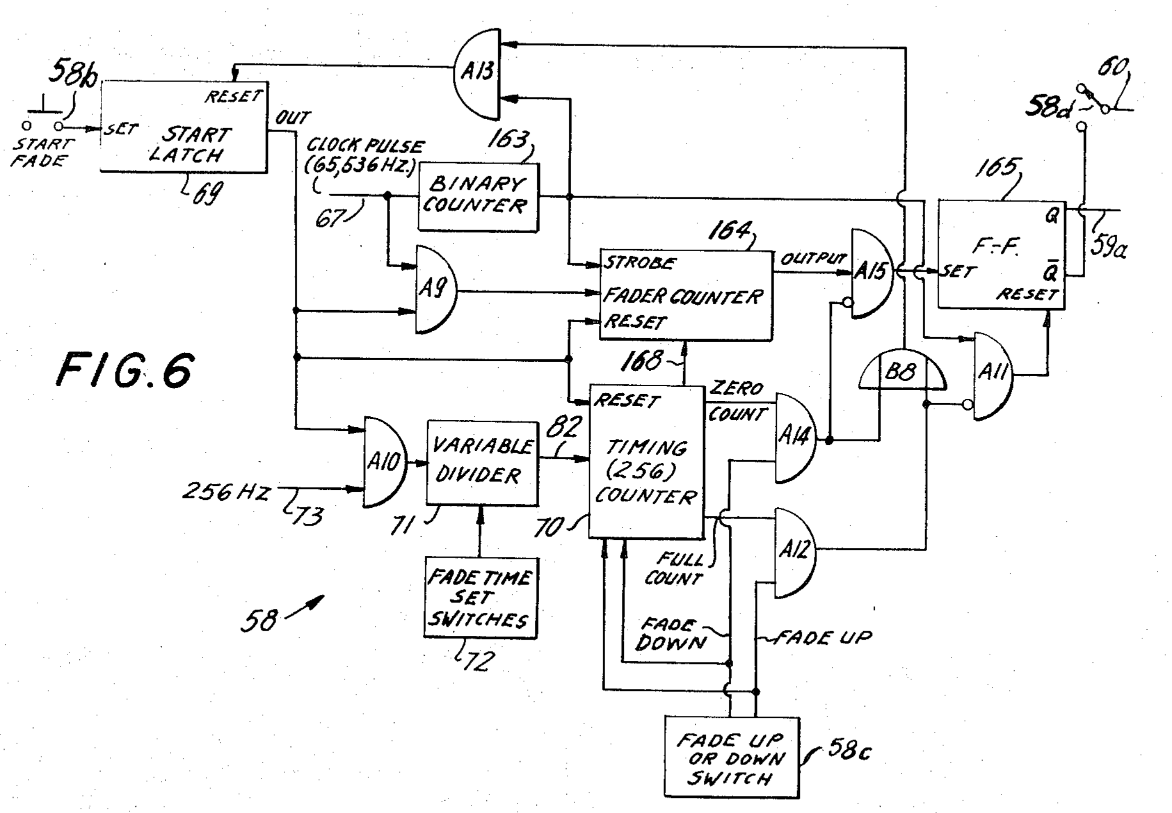
FIG. 6 is a block diagram of an automatically timed fader for use in the lighting control system of FIG. 3.
Figure 7:
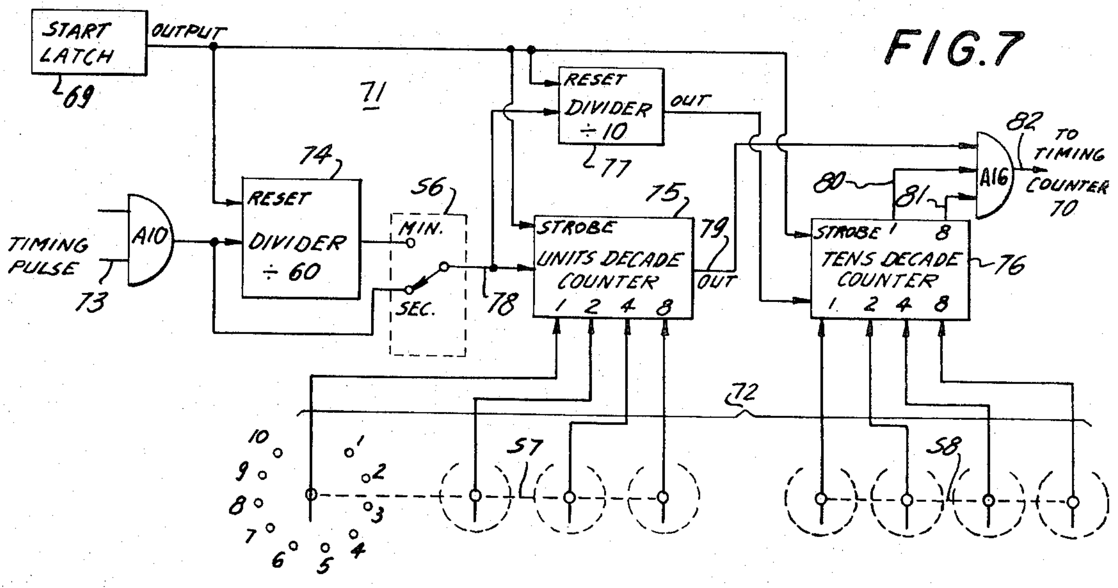
FIG. 7 is a block diagram illustrating details of a portion of the fader of FIG. 6.

A more precise and stable form of fader than that of FIG. 4 is shown in FIG. 5. Both faders operate according to the same principle of dividing a pulse period to provide different percentages of "on" times for different adjustments. Additionally, an optionally used automatically timed fader is included in FIG. 5 in addition to a manually operated X-fader, Y-fader and cross-fader. The automatic timer can be set for up-fading or down-fading or cross-fading, and it has a timer that can be set to determine the time interval of a fading operation through the full range of control. The timer is shown in detail in FIG. 6, and FIG. 7 shows the details of the time-interval selection circuit.

Clock pulse 67 from the timing unit 17 are fed into both fixed counter 63 and X-fader counter 64. Both these counters contain 8 binary stages (for example) with a maximum count capacity of $2^8$ or 256. The presetter 66 is a manually controlled binary encoder whose 8 binary outputs 68 are a function of the position of the encoder lever arm. These 8 binary leads 68 determine the present count to which the fader counter 64 is preset when it is strobed. Each time counter 63 reaches a full count and recycles back to zero, its output both resets flipflop 65 and strobes fader counter 64 to a preset count determined by presetter 66. When fader counter 64 reaches a full count and recycles back to zero, its output sets flipflop 65. The presetter 66 causes fader counter 64 to be strobed in any preset count between 0, when the encoder lever is in one extreme position, to a count of 255 when the encoder lever is in the other extreme position.

Consider the case for the lever positioned for a preset counter of 255. When counter 63 recycles back to zero, its output resets flipflop 65 and strobes fader counter 64 to a preset count of 255. The next clock pulse 67 causes X-fader counter 64 to recycle back to zero, and its output sets flipflop 65. This same clock pulse also advances counter 63 to a count of 1. Flipflop 65 stays set for the next 254 clock pulses, at which time counter 63 reaches a full count of 255. On the next clock pulse 67, counter 63 resets flip-flop 65, and the process repeats. Hence, flipflop 65 is set for 255 clock pulse periods and reset for one clock period.

In general, for a preset count of n, the flipflop is set for $n/256$ part of the time and consequently fader output 59 is active for $n/256$ part of the time. The incremental step changes, or resolution of the fader circuit, is dependent on the number of stages or the count capacity of the fader counter 64, in this case, one part in 256.

The Q output of flipflop 65 is the control line 59 of manual X-fader referred to in the foregoing. For an up-fade, the lever of presetter 66 is gradually moved so that the preset count is increased from 0 to 255. For a down-fade, the lever of presetter 66 is moved in the opposite direction since the fader process is bi-directional.

The Y-fader 57*a* of FIG. 3 is represented in FIG. 5 by components 64*a*, 65*a*, 66*a* and lines 68*a*. Fader 57*a* is the same as the described X-fader, except that line 60 is connected to the $\overline{Q}$ output of the flipflop 65*a*, and whereas the encoder of the X presetter lever is "0" for 0 percent active time, the encoder of the Y presetter lever is "255" for 0 percent active time. For a cross-fade, the X and Y fader presetter levers are moved in opposite directions, i.e., moving one from 0 percent active time to 100 percent active time, while moving the other lever from 100 percent active time to 0 percent active time.

In order to accomplish ideal cross-fading, simultaneously from the X side to the Y side and vice versa, it is necessary to prevent both the X-fader and the Y-fader (FIG. 3) from being active or inactive at the same time. For cross-fading, the Y-fader output 60 is taken by switch 60*a* from the inverted output $\overline{Q}$ of flipflop 65, while the X-fader output 59 is taken from the non-inverted output Q of flip-flop 65.

The X-fader of FIG. 5 has active pulse times represented on line 65Q in FIG. 5A, the Y-fader of FIG. 5 has active pulse times represented on line 65*a*$\overline{Q}$ of FIG. 5A, and any given setting of the X-fader lever in cross-fading is represented on lines 65Q and 65$\overline{Q}$ of FIG. 5A. Each pulse of FIG. 5A has a duty cycle of $n/256$, where $n$ is the number encoded by the related fader lever.

The pulses represented on line 65'Q control the active times of any given sample-and-hold circuit, and those pulses are averaged in the related intensity control unit A01 through A064. For example, for a sample-and-hold signal calling for maximum intensity of 50 percent and for an X-fader setting giving active pulses on line 65'Q of 50 percent duty cycle, the result will produce 25 percent of the maximum light intensity. The same is true, separately, of a Y-fader setting that gives 50 percent duty-cycle pulses on line 65*a'*$\overline{Q}$. However, if both X and Y sample-and-hold circuits were set for 50 percent maximum light intensity, and cross-fading is in operation under control of pulses on lines 65'Q and 65'$\overline{Q}$, the averaged light-level control signal remains at 50 percent of the maximum light level for all adjustments of the cross-fade lever. For cross-fading from one level of light intensity to another under control of any pair of sample-and-hold circuits such as SH14/X1 and SH14/Y1, the averaged signal pulses in the input of intensity control unit A014 would progressively change from one level to the other as the fader lever is moved from one extreme to the other.

Referring to FIG. 3, the faders of either FIG. 4 or FIG. 5 controlling lines 59, 60, 61 and 62 can be operated individually for concurrently fading all 64 stage lights or group of lights. Thus, the X-fader controlling sixty-four lines 59 and the X-fader controlling sixty-four lines 61, and the Y-fader controlling sixty-four lines 60 and the Y-fader controlling sixty-four lines 62 can be used alone for up-fading or down-fading all lights according to the respective maximum intensity limits of sample-and-hold circuits SH1/x1 through SH64/x1, SH1/x2 through SH64/x2, SH1/y1 through SH64/y1 and SH1/y2 through SH64/y2. If the X-fader of lines 59 is used to control all 64 lights, then the faders of lines 60, 61 and 62 are to be set for 0 percent duty cycle, or the sample-and-hold circuits of those lines are adjusted to zero. Alternatively, the faders of all four lines 59, 60, 61 and 62 can all be used independently and concurrently without mutual interference for controlling different stage lights or groups of lights. This is done (for example) by providing output control levels above zero in only the following store-and-hold circuits: SH1/X1 through SH16/X1, SH17/X2 through SH32/X2, SH33/Y1 through SH48/Y1 and SH49/Y2 through SH64/Y2, all other sample-and-hold circuits then being adjusted for zero output. This is so because (as explained earlier) only the highest-level signal at any given instant to any one of the sixty-four intensity control units is the effective control signal for that unit. Moreover, with appropriate control levels in the various sample-and-hold circuits, either of the two X-faders and either of the two Y-faders can be used with each other for independent manual cross-fading of different arbitrarily selected groups of stage lights. Still other combinations are feasible with the illustrative system, and the flexibility can be extended still further by obvious modifications of the illustrative system.

DESCRIPTION OF FIGS. 6 AND 7

The automatic fader 58 of FIG. 6 is the same in principle as the manual fader 57 of FIG. 5. Units 163, 164 and 165, and lines 168 of FIG. 6 correspond to units 63, 64 and 65 and lines 68 of FIG. 5.

In FIG. 6, the presetter 66 of FIG. 5 is replaced by an 8 stage up-down timing counter 70, which automatically sequences the preset count of fader counter 164; the start and termination of the fade process are automatically controlled by gates; and the desired fade time is set by switches 72.

The fade start pushbutton 58b sets start latch 69 which enables input AND gate A9 and A10, resets timing counter 70 and fader counter 164 to zero, and presets variable divider 71 to the preset count selected by the fade time set switches 72. AND gate A10 passes timing pulses 73 to variable divider 71, which divides them by a number determined by the fade time set switches 72 (FIG. 7). Timing pulses 73 occur at a rate of 256 Hz in an example. This repetition rate is selected so that, with a variable divider division ratio of one, the timing counter 70 will require exactly one second to reach a full count; hence, the fade time will be one second. In general, with a repetition rate of 256 Hz, the fade time in seconds is equal to the division ratio of the variable divider 71. In this manner, the fade time may be both conveniently set and displayed (FIG. 1). In addition, the clock pulses 67 are operated in synchronism with the timing pulses 73. The repetition rate of pulse train 67 is 256 times as great as that of 73. Hence, at the minimum fade time of one second, the fader counter 164 will see its full count capacity of 256 clock pulses for each one of the 256 steps of the timing counter 70.

For an "up-fade," timing counter 70 is reset to all zeros, timing ounter 70 is set by switch 58*c* to count "up," that is, forward, and AND gate A12 is enabled.

Figure 6A:
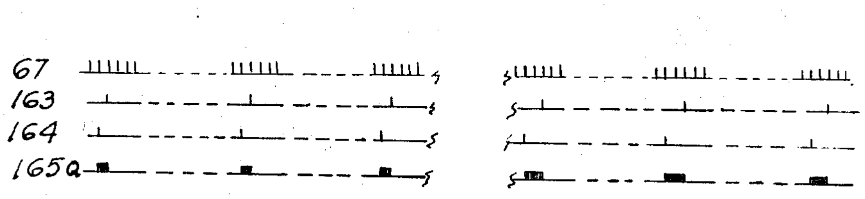
FIG. 6A is a timing chart illustrating the operation of the fader of FIG. 6.

During the first 256 clock pulses 67, binary counters 163 and 164 count in step and reach their full count at the same time. Modified AND gate A11 is normally enabled and passes a reset pulse to flip flop 165 when counter 163 is restored to zero after reaching full count. Both "set" and "reset" signals reach flipflop 165 which remains reset because flipflop 165 is designed so that the "reset" signal controls. After three such counting cycles (assuming a 3-second fade-time adjustment of divider 71), one pulse on line 82 advances counter 70 to "1" which is entered into fader counter 164 as a preset count. Counter 164 reaches its full capacity and is reset one clock pulse before counter 163 provides a reset pulse. Flipflop 165 accordingly is set by counter 164 and reset one clock-pulse later. A train of three pulses of one clock-pulse width appears on output line 59*a* of flipflop 165 (see FIG. 6A) at which time preset timing counter 70 gets another pulse from divider 71 and enters a preset of "2" into fader counter 164. Three pulses of two clock-pulse width then appear on line 59*a*. This process repeats, with the signals on line 59*a* becoming progressively longer until counter 70 has reached its full count.

When timing counter 70 has reached a full count, the output of AND gate A12 inhibits AND gate A11, which prevents the output of counter 163 from resetting flipflop 165. Hence, when the fader counter 164 via AND gate A15 sets flipflop 165, the flipflop stays set and the up-fade is complete.

The output of gate A12, via OR gate B9, also enables AND gate A13. The next output of counter 163 resets start latch 69, via gate A13, which terminates the fade cycle, leaving flipflop 165 set.

For a "down fade," timing counter 70 is reset to a full count of all "ones," timing counter 70 is set by switch 58*c* to count "down," that is backwards, and AND gate A14 is enabled. The progressive changes in pulse length on line 59a duration progressively from 255 clock pulses to one clock pulse-width. When timing counter 70 has counted down to zero the output of gate A14 inhibits modified AND gate A15, which prevents subsequent outputs from fader counter 164 from setting flipflop 165. Hence when the counter 163 resets flipflp 165 via gate A11, flipflop 165 stays reset and the down-fade is complete.

The outputs of gate A14, via OR gate B9, also enables A13. The next output of counter 163 resets start latch 69 via gate A13, which terminates the fade cycle, leaving flipflop 165 reset.

In the same manner as the manual fader, the non-inverted output Q of flipflop 165 controls line 59*a* of the automatic X-fader 58, while the inverted output $\overline{Q}$ of a flip-flop 165 of another such automatic fader like that described above is used in the Y-fader 58*a* (FIG. 3). Switch 58*d* can be operated to connect line 60 to the $\overline{Q}$ output of flipflop 165 of the automatic X-fader, to form an automatic cross-fader.

DESCRIPTION OF FIG. 7

FIG. 7 shows details of variable divider 71 and fade time set switches 72.

Switches S6, S7 and S8 are the fade time set switches 72 in FIG. 6. Each switch S7 and S8 has ten positions and four decks, and in the sequential positions they provide the proper code input to decade counters 75 and 76, respectively. These switches select the desired fade time by controlling the overall division ratio between timing clock pulses 73 and the timing counter 70. Switch S6 controls the unit time in either minutes or seconds. For seconds, pulses 73 are counted directly by the decade counters 76 and 76. For minutes, pulses 73 are first divided by 60 by divider 74.

The start latch 69 of FIGS. 6 and 7 initially resets the two dividers 74 and 77 to zero, and strobes both decade counters 75 and 76 to a preset count determined by their dorresponding preset switches S7 and S8. Switches S7 and S8 are wired so that each decade counter is preset to the complement, with respect to 10, of the switch position. For example, in switch position 3, the counter is present to an initial count of 10 — 3 or 7. Switch S7 selects the unit time, 1 through 10. Switch S8 selects the tens time, 00 through 90. These settings are additive, in either seconds or minutes. This results in a minimum fade time of one second and a maximum time of 100 seconds in the seconds range, and one to 100 minutes in the minute range.

In order for the fade time to correspond in seconds (or minutes) exactly to the division ratio, the input frequency of the timing pulses 73 should equal the full count capacity of the timing counter 70 and the clock pulses 67 (FIG. 6) are correspondingly related as already described.

The input pulses on line 78 to units counter 75 from switch S6 are counted by both the units decade counter 75 and the tens decade counter 76. However, before they are counted by the tens counter, they are first divided by a factor of 10 by the divider 77. After the units counter 75 has reached (or been preset) to a full count of 9, the next pulse on line 78 causes the units counter to recycle back to zero, which produces an output signal on line 79. This output is fed to AND gate A16.

When the tens counter 76 has reached (or been preset) to a full count of 9, the resulting binary outputs 80 and 81 become active and act together to enable gate A16. The output 82 of gate A16 is the input to timing counter 70 of FIG. 6. Whenever output 79 of the units counter is produced at a time when outputs 80 and 81 have enabled A16, output 82 is produced. In other words, after both decade counters have reached a full count of 9, the next input pulse 78 causes gate A16 to produce an output signal on line 82.

With switch S8 set at 100 (first position), gate A16 is enabled by the 80 and 81 outputs of the tens decade counter. If at the same time switch S7 is set to $n$ seconds (nth position of switch), every nth pulse 78 will produce an output from the units decade counter. This output is passed by the enabled gate A16 to the timing counter 70 and hence the system divides by $n$.

With switch S8 set to 10 (second position), gate A16 will not be enabled until after 10 pulses on line 78 because one output pulse is required from divider 77 to change the tens decade counter from its preset count of $10 - 2 = 8$ to a count of 9, at which count outputs 80 and 81 will enable gate A16.

In general, with switch S7 set to its nth position and switch S8 to its mth position, the system will divide by $n + 10\ (m-1)$. This division ratio will correspond exactly to the fade time in seconds or minutes. The precision of this fade time is limited only by the accuracy of the input timing pulse 73 and the clock pulses 67.

To avoid the need to set the fade time switches manually, the fade time data may be stored in digital form in the memory during rehersal. Two channels can be set aside for this purpose since 8 bits are required for the actual time, one bit to determine minutes or seconds, and one bit to initiate the start latch. Switches S7 and S8 would be supplemented by an 8 bit storage register. This storage register would be arranged like the buffer storage registers of FIG. 3 and would be filled during memory transfer. Switches 6, 7 and 8 would supply fade-timing data during rehearsal for entry into the memory unit.

DESCRIPTION OF FIG. 8

Figure 8:
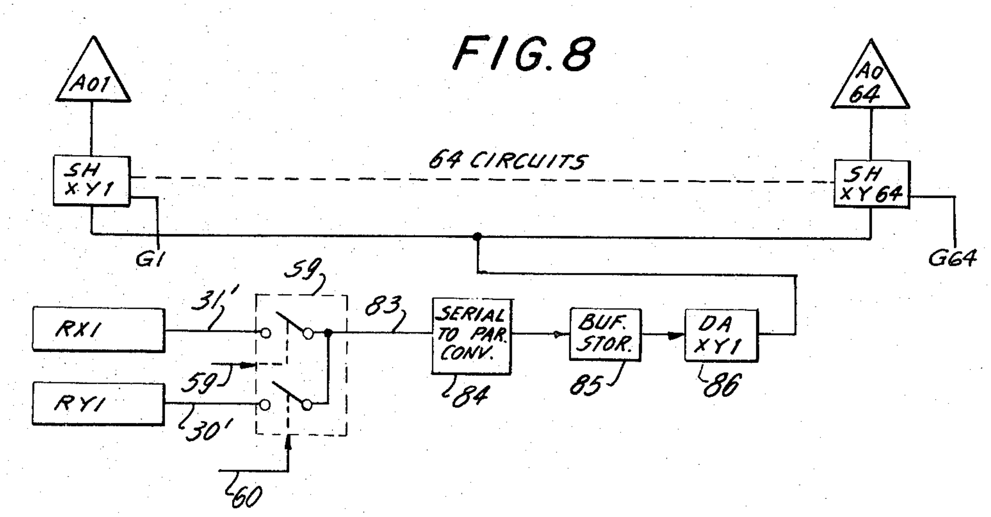
FIG. 8 is a block diagram illustrating a modification of part of the stage lighting system of FIG. 3.

FIG. 8 represents a modification of part of the system of FIG. 3, reducing substantially the number of components in the system. In FIG. 3 the output of each recirculating register RX1 and RY1 is directed separately to its own output converting system, including its own serial-to-parallel converter, its own buffer storage register, and its own digital-to-analog converter, finally to its own set of 64 sample-and-hold circuits. These converting systems for two recirculating registers are replaced in FIG. 8 by one sequence of a serial-to-parallel converter 84, a buffer storage register 85, a digital-to-analog converter 86 and one set of 64 sample-and-hold circuits SH X-Y/1 through SH X-Y/64. As in FIG. 3, the output of digital-to-analog converter 86 is routed to the sample-and-hold circuits sequentially under control of channel-select lines G1-G64.

Electronic switch S9 connects input line of serial-to-parallel converter 84 to a selected one of recirculating registers RX1 and RY1. Any selection remains in effect from the start to the end of at least one full cycle of recirculation, under control of a timing unit like unit 17 of FIG. 2. Control input for connecting line 83 to either output 30′ or 31′ of FIG. 8 is derived from the faders of FIGS. 5 and 6, via leads 59 and 60. For the system to operate, the 512-bit circulation of each selected register RX1 or RY1 must occur during one clock-pulse period on line 67 of FIGS. 5 and 6. Accordingly, the clock-pulse rate of the recirculating registers in FIG. 8, as well as the recycling periods of the serial-to-parallel converter 84, the buffer storage register 85 and the digital-to-analog converter 86 are 512 times faster than those of th system of FIG. 3, in case the same clock-pulse frequency is used to determine the fader time interval.

Switch S9 is controlled by the fader outputs 59 and 60. When output 59 is active, serial-to-parallel converter 84 is switched to recirculating register RX1; when output 60 is active, serial-to-parallel converter 84 is switching to recirculating register RY1. As before, the channel data are parallel transferred to the buffer register 85 where they are stored for one channel period, as the next channel data are being serially fed into serial-to-parallel converter 84. The parallel outputs of register 85 are fed into the digital-to-analog converter 86, and the analog signal is routed to the related sample-and-hold circuits.

The fader outputs 59 and 60 operate switch S9 in synchronism with the recirculation of the data in the X and Y registers. As before, if switch S9 is switched at signal sources RX1 and RY1 for equal times, the result at the channel output will be a level half-way between X and Y. Likewise, this holds true for any other proportion of the fader time period. However, the minimum interval of time that switch S9 may be switched at either register RX1 and RY1 is one recirculation period of the registers, since each channel data is available once during one recirculation period. This period also represents the finest resolution possible.

Assume use of the manual fader of FIG. 5, with fader counter 64 consisting of 8 binary stages. For maximum operation frequency, one recirculating period of the registers will equal one count period for fader counter 64, since this is the time resolution of the fader system. Inasmuch as fader counter 64 has a capacity of 256 counts, one fader cycle period is equal to 256 times the register recirculation period. In this example, the clock shift frequencies of the recirculating register is 512 times the clock frequency of counter 64.

The outputs of the sample-and-hold circuits will vary as switch S9 is switched at a rate determined by the above fader cycle period. Since this must be filtered to obtain the average value, it has a minimum rate in a practical system. Assuming a fader cycle period of 1/32 second or a frequency of 32 Hz, the minimum recirculation rate becomes $256 \times 32$ or 8192 Hz.

With a 64 channel system of 8 bits per channel, the capacity of the X and Y registers is 512 bits. For the above recirculation rate, the shift clock frequency becomes $8192 \times 512$ or about 4.1M Hz.

The two sections or poles of switch S9 are independently controlled by the X and Y fader outputs 59 and 60. If line 59 along is active the data in register RX1 may be either faded up or faded down, as described under FIG. 3. Likewise, if line 60 alone is active the data is register RY1 may be faded up or down. Both control lines 59 and 60 may be active simultaneously, as in the case where register RX1 has signals for only certain channels and register RY1 has signals for other channels; and in that case, the data in both registers RX1 and RY1 may be faded in either direction. Finally, cross-fading between registers RX1 and RY1 may be accomplished by up-fading one, while simultaneously down-fading the other.

The fader cycle period of 1/32 second mentioned above is related to the need for avoiding light flicker and to the capability of the system to respond rapidly to the fader. A longer fader cycle period could be tolerated if a filter having a long time constant is such in the light-intensity control circuits, but a long time constant here would retard the response of the system to the fader.

What is claimed is:

1. Control apparatus for plural lighting channels or one or more lighting units per channel, including a light-intensity control unit for each channel responsive to an applied control signal, a complement of sample-and-hold circuits coupled to said control units, respectively, for providing said control signals, a recirculating register, means for entering into said recirculating register a succession of bits including successive groups of bits comprising digital light-intensity codes for said control units, respectively, and a translating link for converting digital light-intensity codes from said recirculating register into analog signals for said complement of sample-and-hold circuits, said translating link including, in the order named, a serial-to-parallel converter, a buffer storage register and a digital-to-analog converter, and means for applying the output of said digital-to-analog converter to said complement of sample-and-hold circuits, successively.

2. Control apparatus for plural lighting channels in accordance with claim 1, including timing means for coordinating (*a*) the circulation of bits in the recirculating register and (*b*) the entry of successive groups of bits into said buffer storage register, and (*c*) the application of the output of said converter to said sample-and-hold circuits successively so that a constant relationship is maintained between the digital light-intensity codes in the recirculating register and the converter output applied to corresponding sample-and-hold circuits coupled to said light-intensity control units, respectively.

3. Lighting control apparatus in accordance with claim 1, further including a second recirculating register, and selective means for switching the serial-to-parallel converter of said translating link to one of said recirculating registers.

4. Lighting control apparatus in accordance with claim 1, further including a second recirculating register, a second translating link as aforesaid, and a second complement of store-and-hold circuits coupled to the light-intensity control units of said lighting channels, and including respective rectifying devices in the coupling of each light-intensity control units to a corresponding one of the sample-and-hold circuits in the first-mentioned complement thereof and to a corresponding one of the sample-and-hold circuits of the second complement thereof, for rendering effective the greater one of the signals from the sample-and-hold circuits coupled to any given light-intensity control unit.

5. Lighting control apparatus in accordance with claim 1, further including a fader for cyclically switching "on" and "off" the output of at least certain of said sample-and-hold circuits to said light-intensity control units, the ratio of the "on" and "off" intervals of the fader being adjustable to vary proportionally the effects of said certain sample-and-hold circuits in determining the lighting intensity of the corresponding lighting channels.

6. Lighting control apparatus in accordance with claim 4, further including first and second mutually independent faders for cyclically switching "on" and "off" the output of faders for cyclically switching "on" and "off" the output of at least certain of said first-mentioned complement of sample-and-hold circuits and at least certain of said second complement of sample-and-hold circuits, the ratio of the "on" and "off" times of each said fader being adjustable to vary proportionally the effects of said certain sample-and-hold circuits in determining the lighting intensity of the corresponding lighting channels.

7. Lighting control apparatus in accordance with claim 4, further including a cross-fader for cyclically switching "on" and "off" the output of at least certain of the sample-and-hold circuits of said first-mentioned complement thereof and, complementally, cyclically switching "off" and "on" the output of the corresponding sample-and-hold circuits of said second complement thereof, the "on" duty-cycle of said certain sample-and-hold circuits of said first-mentioned complement being variable between 0 and 100 percent limits inversely with the "on" cycle of the sample-and-hold circuits of said second complement.

8. Lighting control apparatus in accordance with claim 5, wherein said fader includes a cyclically operable main counter having an input source of clock pulses to be counted up to a predetermined number for determining the duration of an on-and-off cycle of the fader, and a fader counter responsive to said clock pulses and having digital adjusting means to provide an output signal after a smaller number of clock pulses then said predetermined number, and means responsive to both said main counter and said fader counter for determining the "on" and "off" intervals of the fader.

9. Lighting control apparatus in accordance with claim 1, wherein said entering means includes a memory unit having plural memories each corresponding in capacity to the capacity of said recirculating register, each memory having plural groups of intensity-control bits and means for selecting one of said memories for entry into said recirculating register by said entering means.

10. Lighting control means in accordance with claim 1, wherein said entering means includes a manual light-intensity controller having means for providing a range of light-intensity codes, and channel-selecting timing means for controlling entry of a light-intensity code from said providing means into a channel of the recirculating register related to the lighting channel to be controlled thereby.

11. Lighting control means in accordance with claim 1, wherein said entering means includes means for providing a succession of light-intensity codes for controlling respective lighting channels, means for coordinating the entry of said codes into the recirculating register with the circulation of the channels in the register, a gate for controlling the entry of said succession of codes into the recirculating register in lieu of the successive groups of bits recirculating in the register, and means responsive to the absence of a code at any point in the succession of codes for blocking said gate and thereby causing continued circulation of the group of bits then about to recirculate in the recirculating register.

12. Lighting control means in accordance with claim 1, wherein said entering means includes a memory unit containing plural memories each including a storage channel for each of said lighting channels, means for selecting a memory for read-out from said memory unit, a parallel-to-serial converter for converting the contents of each storage channel into a sequence of bits for successive entry into said recirculating register, and timing means for causing successive channels of a selected memory to enter said parallel-to-serial converter for entry into successive channels of the recirculating register.

13. Lighting control means in accordance with claim 1, wherein said entering means further includes manual light-intensity code-providing means, channel-selecting timing means, and switching means normally connecting said parallel-to-serial converter to the selected memory but operable in response to said channel-selecting timing means to switch the parallel-to-serial converter from the memory to said light-intensity code-providing means for entry of a selected code in a selected channel of the recirculating register.

14. Control apparatus for plural lighting channels of one or more lighting units per channel, including a light-intensity control unit for each channel responsive to the time-averaged value of the applied control signal, a complement fo sample-and-hold circuits coupled to said control units, respectively, for providing said control signals, first and second recirculating registers, means for entering into each of said registers a succession of bits including successive groups of digital light-intensity codes, a common translating link for converting successive groups of successive bits constituting digital light-intensity codes into successive analog control signals for said sample-and-hold circuits, said translating link having a serial-to-parallel converter, a buffer storage register and a digital-to-analog converter arranged in the order named, means for coupling the successive analog signals from said digital-to-analog converter to said sample-and-hold circuits successively, and selective means for switching the serial-to-parallel converter of said translating link to one of said first and second recirculating registers.

15. Control apparatus in accordance with claim 14 including means for synchronizing said switching means with said recirculating registers so that switching of the translating link away from either of said recirculating registers cannot occur within a group of successive bits.

16. Control apparatus in accordance with claim 14 including timing means causing said recirculating registers to operate in synchronism and limiting the operation of the switching means so as to occur only at intervals equal to the time for an integral number of complete circulations but not to occur within a group of successive bits.

17. Control apparatus in accordance with claim 14 wherein said bit entering means includes a memory unit having a plurality of memories each having plural channels comprising digital light-intensity codes, the plural channels of each memory corresponding to said plural lighting channels, and means for converting the plural channels of the memories into successive groups of bits for entry into a selected one of said recirculating registers, further including timing means causing said recirculating registers to operate in synchronism and limiting the operation of said switching means to occur only following an intergral number of circulations in the recirculating registers of whole digital codes for each of said plural channels.

18. Control apparatus in accordance with claim 14, including timing means coordinating the circulation of said recirculating registers and said switching means so that switching occurs only after an integral number of circulations in the recirculating register of the groups of digital light-intensity codes for all of said plural lighting channels, further including fader means for reversing said switching means repeatedly so as to cause the codes of each recirculating register, when converted to analog form, to contribute to the light-intensity control in accordance with the ratio of the number of circulations of the first recirculating registers to the number of circulations of the second recirculating register when switched to said serial-to-parallel converter.

19. Control apparatus in accordance with claim 18, wherein the fader includes a clock pulse source, a main pulse counter for establishing a switching period for operating said switching means, a fader pulse counter for causing reversal of the switching means at a time during the switching period to determine said ratio of numbers of circulations, the clock pulse source and the main and fader counters being coordinated with the operation of said recirculating registers for operating the switching means only after integral circulations as aforesaid.

20. Lighting control apparatus, including at least one light-intensity control unit responsive to the averaged input signal, means for providing said control unit with an input analog signal representing a maximum desired light intensity, and a fader providing proportioned control of said control unit by said input analog signal, said fader including a pulse counter for establishing a fader cycle, a pulse source providing pulses to said pulse counter, bistable means providing an output having an active state and an inactive state, said bistable means being coupled to the analog signal providing means for causing the analog signal to be switched "on" in one of said states and to be switched "off" in the other of said states, and a fader counter responsive to said pulses and coordinated with said pulse counter and adjustable to operate in response to any number of pulses up to the number of pulses in the fader cycle, said pulse counter and said fader counter controlling said bistable means to reverse the state thereof repeatedly.

21. Lighting control apparatus in accordance with claim 20, including a manual encoder controlling said fader counter for determining the number of pulses required by the fader counter to reverse the bistable means.

22. Lighting control apparatus in accordance with claim 20, including a time-variable encoder for adjusting said fader counter for determining the number of pulses required for reversing said bistable means, said fader thereby operating automatically.

23. Lighting control apparatus in accordance with claim 20, adapted as a cross-fader, including second means for providing said control unit with an analog control signal representing another maximum desired light intensity, an OR gate coupling both of said analog signal providing means to said light-intensity control unit, said bistable means providing another output having two states, the state of one output being the inverse of the other, each output in one state rendering a related one of said analog control signals active and in the other state rendering the related one of said analog control signals inactive.

* * * * *